(12) United States Patent
Goyal et al.

(10) Patent No.: US 10,177,989 B1
(45) Date of Patent: Jan. 8, 2019

(54) COMPUTER EFFICIENCY BY PREDICTING EVENT OCCURRENCES

(71) Applicant: IFTTT, Inc., San Francisco, CA (US)

(72) Inventors: Anuj Goyal, San Francisco, CA (US); Sanny Liao, San Francisco, CA (US); Apurva Joshi, Newark, CA (US); Nicholas Leach, Oakland, CA (US); Joseph Sims, San Francisco, CA (US)

(73) Assignee: IFTTT, INC., San Francisco, CA (US)

( * ) Notice: Subject to any disclaimer, the term of this patent is extended or adjusted under 35 U.S.C. 154(b) by 193 days.

(21) Appl. No.: 15/425,806

(22) Filed: Feb. 6, 2017

(51) Int. Cl.
*G06F 15/173* (2006.01)
*H04L 12/24* (2006.01)
*G06N 7/00* (2006.01)
*H04L 12/28* (2006.01)

(52) U.S. Cl.
CPC ............. *H04L 41/20* (2013.01); *G06N 7/005* (2013.01); *H04L 12/2816* (2013.01); *H04L 41/16* (2013.01)

(58) Field of Classification Search
CPC ..... H04L 41/20; H04L 12/2816; H04L 41/16; G06N 7/005
See application file for complete search history.

(56) References Cited

U.S. PATENT DOCUMENTS 9,022,140 B2 * 5/2015 Marx ...................... E21B 44/00
 175/24
9,043,329 B1 * 5/2015 Patton ................. G06F 17/3087
 707/740

* cited by examiner

*Primary Examiner* — Sm A Rahman
(74) *Attorney, Agent, or Firm* — Hickman Palermo Becker Bingham LLP

(57) ABSTRACT

In an embodiment, a data processing method providing an improvement in computer efficiency in transmitting data poll messages to another computer, the method comprising: using a first computer, transmitting a first plurality of data poll messages to a second computer, receiving event data from the second computer, and storing the event data in event history storage; based upon the event data in the event history storage, calculating a first estimate of a probability of a particular event occurring in a first specified time period; in response to determining that the first estimate is greater than 0, calculating a total number of times to check for the same particular event in the same specified time period; based upon the event data in the event history storage, calculating a second estimate of a probability distribution of the same particular event during the same specified time period; creating and storing a schedule of a plurality of times at which to transmit a second plurality of data poll messages to the second computer, based upon dividing the specified time period by the second estimate; transmitting the second plurality of data poll messages to the second computer at the plurality of times specified in the schedule, receiving responsive event data from the second computer, and updating the event history storage using the responsive event data; wherein the method is performed using one or more computing devices.

15 Claims, 4 Drawing Sheets

COMPUTER EFFICIENCY BY PREDICTING EVENT OCCURRENCES

TECHNICAL FIELD

The technical field of the present disclosure relates to data analysis using computer programs. Another technical field is computer programs for analyzing and processing data to predict occurrences of external events, and to and generate schedules for sending polling requests to external devices, systems or programs. Certain embodiments are useful in collecting data from internet of things (IoT) devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern society has become increasingly automated due to the interconnectivity of systems and devices. For example, smart homes feature systems and devices that enable programmed control of lighting, heating, refrigeration, home security, and other aspects of the home based on personal preference. As another example, automatic alerts can be sent based on conditions that meet a set of criteria, such as automated text messages or emails sent in response to a breach in a home security system.

One way of facilitating automation involves polling a server computer to obtain data that the server computer has collected about events. For example, if an individual wants to receive an email alert only if a specific post appears on a website, then a system may be programmed to poll the relevant web server repeatedly, in set intervals, until an event such as the specific post is found. However, repeatedly polling a server for data every few minutes, when the data may not exist at almost all the polling intervals, wastes network bandwidth, memory and CPU resources. When the desired event may not occur for hours or days, repeated polling wastes resources. Furthermore, if the event occurs just after a particular polling operation, the polling process described above will not find the event until the next poll is scheduled, which creates a lag in response time. In some contexts, the resulting time lag is not acceptable. Thus, without a targeted approach to requesting relevant data at specific periods of time when the likelihood of successfully finding an event is higher, polling can be inefficient and resource-intensive.

Thus, there is a need for an improved data processing method that can improve the efficiency of polling operations.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
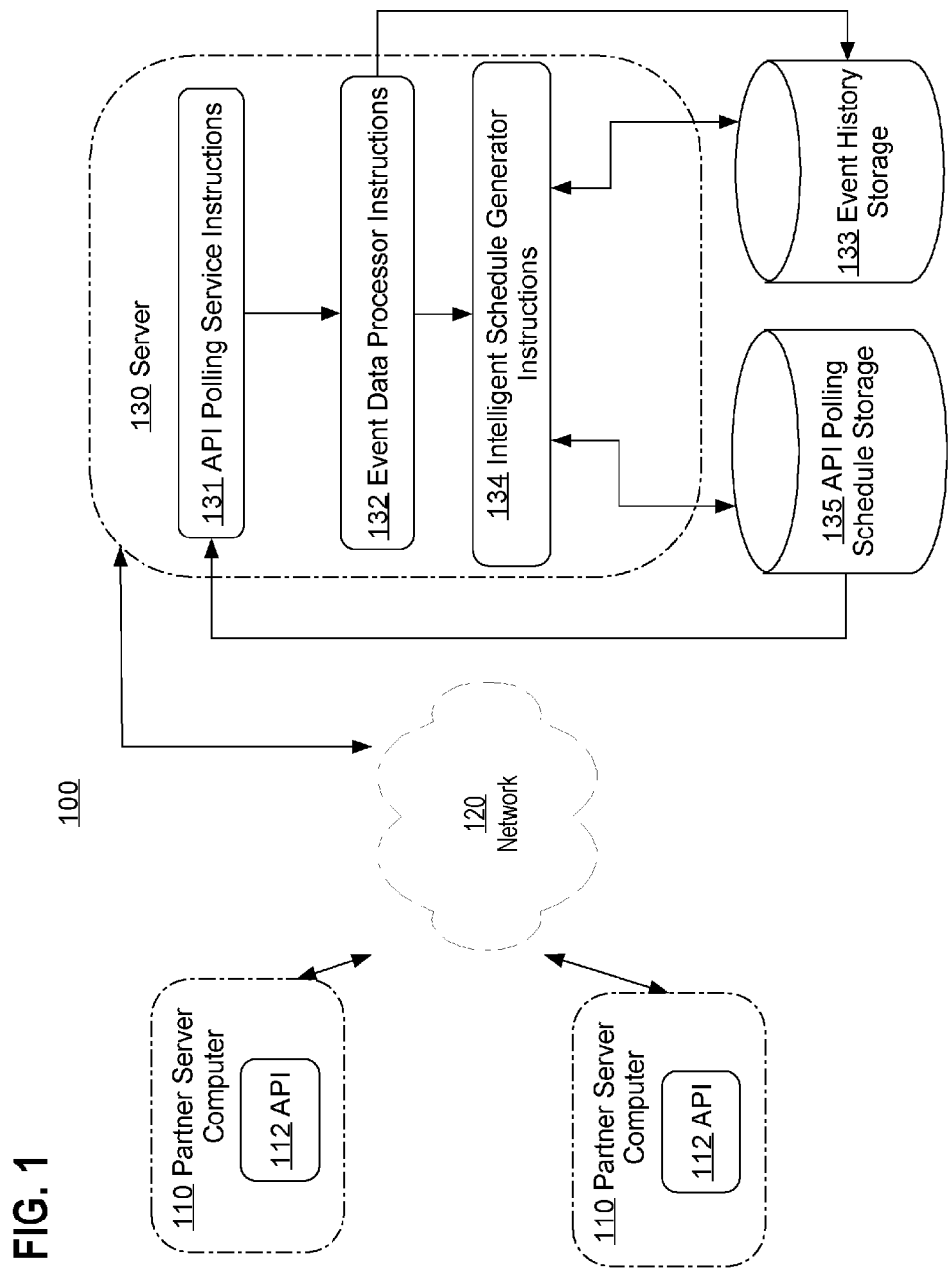
FIG. 1 illustrates a networked computer system in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural Overview
      2.1 API Polling Service
      2.2 Event Data Processor Instructions
      2.3 Event History Data Storage
      2.4 Intelligent Schedule Generator Instructions
      2.5 API Polling Schedule Data Storage
   3.0 Functional Overview
   4.0 Hardware Overview
   1.0 General Overview According to various embodiments, methods and systems of data analysis are provided that enable improved computer efficiency by predicting event occurrences and generating a polling schedule based on the predicted event occurrences. Unlike past approaches, the present techniques do not rely upon a fixed schedule that does not consider what events actually occurred before and when they occurred. Instead, the present techniques apply automatic computer-based statistical analysis to data representing past events and seek to define a polling schedule that is accurate and efficient based on the actual occurrence of past events.

In an embodiment, a data processing method providing an improvement in computer efficiency in transmitting data poll messages to another computer comprises, using a first computer, transmitting a first plurality of data poll messages to a second computer, receiving event data from the second computer, and storing the event data in event history storage; based upon the event data in the event history storage, calculating a first estimate of a probability of a particular event occurring in a first specified time period; in response to determining that the first estimate is greater than zero, calculating a total number of times to check for the same particular event in the same specified time period; based upon the event data in the event history storage, calculating a second estimate of a probability distribution of the same particular event during the same specified time period; creating and storing a schedule of a plurality of times at which to transmit a second plurality of data poll messages to the second computer, based upon dividing the specified time period by the second estimate; transmitting the second plurality of data poll messages to the second computer at the plurality of times specified in the schedule, receiving responsive event data from the second computer, and updating the event history storage using the responsive event data; wherein the method is performed using one or more computing devices.

In an embodiment, a computer system that is programmed to provide an improvement in computer efficiency in transmitting data poll messages to another computer, comprises: API polling service instructions hosted at a first computer and programmed to transmit a first plurality of data poll messages to a second computer, to receive event data from the second computer, and to signal event data processor instructions; wherein the event data processor instructions are programmed to store the event data in event history storage; intelligent schedule generator instructions hosted at the first computer and programmed, based upon the event data in the event history storage, to: calculate a first estimate of a probability of a particular event occurring in a first specified time period; in response to determining that the first estimate is greater than zero, calculate a total number of times to check for the same particular event in the same specified time period; based upon the event data in the event history storage, calculate a second estimate of a probability distribution of the same particular event during the same specified time period; create and store, in API polling schedule storage coupled to the first computer, a schedule of a plurality of times at which to transmit a second plurality of data poll messages to the second computer, based upon dividing the specified time period by the second estimate; wherein the API polling service instructions are further programmed to transmit the second plurality of data poll messages to the second computer at the plurality of times specified in the schedule, to receive responsive event data from the second computer, and to update the event history storage using the responsive event data.

In an embodiment, a data processing method providing an improvement in computer efficiency in transmitting data poll messages to another computer, comprises: using a first computer, transmitting a first plurality of data poll messages to an application program interface (API) of a second computer, receiving event data from the second computer, and storing the event data in event history storage; based upon the event data in the event history storage, calculating a first estimate of a probability of a particular event occurring in a first specified time period using a programmed logistic regression comprising instructions for computing:

$$P(r_e | t_d) = \frac{1}{1 + e^{(-\sum_{n=1}^{N} w_i f_{re}i)}}$$

where $f_{r_e}i$ is the value of an $i^{th}$ factor for an event $r_e$; $w_i$ is a weight associated with the $i^{th}$ factor and reflects a relationship between the $i^{th}$ factor and the probability of the particular event occurring in the first specified time period; in response to determining that the first estimate is greater than 0, calculating a total number of times to check for the particular event in the specified time period using a programmed function comprising instructions for computing:

$$f_{r_ed} = s \cdot P(r_e | t_d)$$

where s is a scaling factor; based upon the event data in the event history storage, calculating a second estimate of a probability distribution of the same particular event during the same specified time period using a programmed kernel density estimation algorithm comprising instructions for computing:

$$f_{r_e}(t) = \frac{1}{\sum_{k=1}^{m} w_k} \sum_{j=1}^{m} w_j \frac{1}{n_j h_j} \sum_{i=1}^{n_j} K\left(\frac{t - t_{ji}}{h_j}\right)$$

where m comprises a total number of types of events; $n_j$ is a total number of occurrences of the particular event j in the specified time period; K(.) is a kernel function; $h_j > 0$ is a smoothing parameter for event j; $w_j$ and $h_j$ are learned using the event data in the event history storage; creating and storing a schedule of a plurality of times at which to transmit a second plurality of data poll messages to the second computer, based upon dividing the specified time period by the second estimate; transmitting the second plurality of data poll messages to an Application Program Interface (API) of the second computer at the plurality of times specified in the schedule.

2.0 Structural Overview

FIG. 1 illustrates a networked computer system in an example embodiment.

In the example of FIG. 1, a networked computer system 100 may facilitate the exchange of data between one or more computers, such as one or more server computers and one or more partner server computers. For purposes of illustrating a clear example, FIG. 1 illustrates a server 130 and partner servers 110 coupled communicatively to a network 120; in other embodiments, there may be any number of server computers involved in a system that uses the present techniques.

The server 130 is a computer programmed with instructions for calculating when to send messages with poll requests, or other types of messages, to the partner servers 110. Each of the partner servers 110 is a target of the poll requests or messages, and may be associated with a data source that can be polled, retrieved, or otherwise obtained over the network 120 by the server 130 for a variety of purposes. For example, partner servers may host news feeds, weather data, data from home automation systems, data from internet of things (IoT) devices of any type, and so forth. When server 130 obtains data from partner servers 110 via polling or other messaging, the server 130 may forward the received data to one or more client computers over network 120 or another network, process the received data within server 130 before forwarding, or perform any other suitable analysis on the received data.

Network 120 broadly represents a combination of one or more local area networks, wide area networks, global interconnected internetworks, such as the public internet, or a combination thereof.

Each partner server 110 has an Application Program Interface (API) 112 that is programmed with methods, functions or other software elements that can be invoked or called by transmitting an API call having a specified name and attributes to the partner server. The use of an API is optional and the partner servers 110 may be programmed to respond to requests, calls or messages from server 130 in other ways, for example, using a dedicated request-response protocol. Server 130 may comprise an API polling service instructions 131 containing API polling service instructions, event data processor instructions 132 containing event data processor instructions, and intelligent schedule generator instructions 134 containing intelligent schedule generator instructions. Server 130 may be programmed or configured to coordinate communication with partner server 110, and to access and retrieve data stored in event history data storage 133 and/or API polling schedule storage 135.

In an embodiment, API polling service instructions 131 may cause server 130 to poll event data from the partner server 110 and generate event tracking data containing the specific time a particular event occurred. The event data and event tracking data may then be transferred to event data processor instructions 132, which may format the data. The data may be stored in event history data storage 133 and used by intelligent schedule generator instructions 134 to generate polling schedules. The polling schedules may be stored in API polling schedule storage 135 and subsequently used by API polling service instructions 131 for future polling.

While each of the components listed above is illustrated as if located on a single computer, one or more of the components listed above may be part of and/or executed on different computers. For example, event history storage 133 and/or API polling schedule storage 135 may be located on separate computers from API polling service instructions 131, event data processor instructions 132, and intelligent schedule generator instructions 134. As another example, event history storage 133 and/or API polling schedule storage 135 may be storage drives coupled to server 130.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

2.1 API Polling Service Instructions

API polling service instructions 131 may be programmed to transmit data poll messages to API 112 of partner server 110 requesting specific event data at specific times. API polling service instructions 113 may also contain instructions programmed to receive event data from partner server 110 and generate event tracking data, which tracks the specific time a particular event occurred. API polling service instructions 131 may also contain instructions programmed to and signal and/or transfer the event data and the event tracking data to event data processor instructions 132.

As noted above, the API 112 may be programmed with methods, functions or other software elements that can be invoked or called by transmitting an API call having a specified name and attributes to the partner server. In response, the API 112 at a partner server 110, or other instructions executed at the partner server, form and send a response message to the calling computer. For example, server 130 can be programmed to poll each partner server 110 for specified kinds of new or updated data by remotely calling API functions that have been defined in APIs 112 of the partner servers 110. API calls may consist of HTTP GET requests from server 130 directed to a web server hosted in the partner servers 110 and comprising a parameterized URL that includes an API call name and one or more attributes or parameters. A response from API 112 may comprise an HTTP POST request back to the server 130 that contains a data update in the payload.

2.2 Event Data Processor Instructions

Event data processor instructions 132 may be programmed to receive the event data and event tracking data generated by API polling service instructions 131. Event data processor instructions 132 may then transform the data into the appropriate format required by event history storage 133, and store the data in event history storage 133.

2.3 Event History Storage

The event history storage 133 may contain instructions programmed to store a history of all the events as key-value pairs. Each key in the key-value pairs may be a combination of an event identification (ID) value and a date value or timestamp. Older data may be automatically deleted based on the key date. The value in the key-value pairs may be a list of the exact time an event occurred on a particular day. The time may be recorded in any temporal instructions of measure such as seconds, minutes, or hours.

2.4 Intelligent Schedule Generator Instructions

Intelligent schedule generator instructions 134 may be programmed to process the history of all events stored in the event history storage 133 using a programmed logistic regression, programmed function, and/or a programmed kernel density estimation algorithm, as further described in other sections herein. The programmed logistic regression may calculate an estimate of a probability of a particular event occurring in a specified time period, as further described herein. The programmed function may calculate a total number of times to check for the particular event in the specified time period, as further described herein. The programmed kernel density estimation algorithm may calculate an estimate of a probability distribution of the same particular event during the same specified time period, as further described herein. Intelligent schedule generator instructions 134 may then generate a polling schedule based on the probability of certain events occurring at certain times. The polling schedule may be used by API polling service instructions 131 to increase or decrease the frequency of polling depending on the probability of the event occurring.

2.5 API Polling Schedule Storage

API polling schedule storage 135 may contain instructions programmed to store the schedule generated by intelligent schedule generator instructions 134 as key-value pairs. The key in the key-value pairs may be, for example, a day and a time during the day. The value in the key-value pairs may be, for example, a list of all event identifiers to be polled at the day and time indicated by the key. The stored schedule then is used as a basis of executing polling operations by sending a poll message to a particular computer, such as a partner server 110, at the days and times indicated in the schedule, to request data for events specified in the corresponding event identifier stored in the schedule.

3.0 Functional Overview

Figure 2:
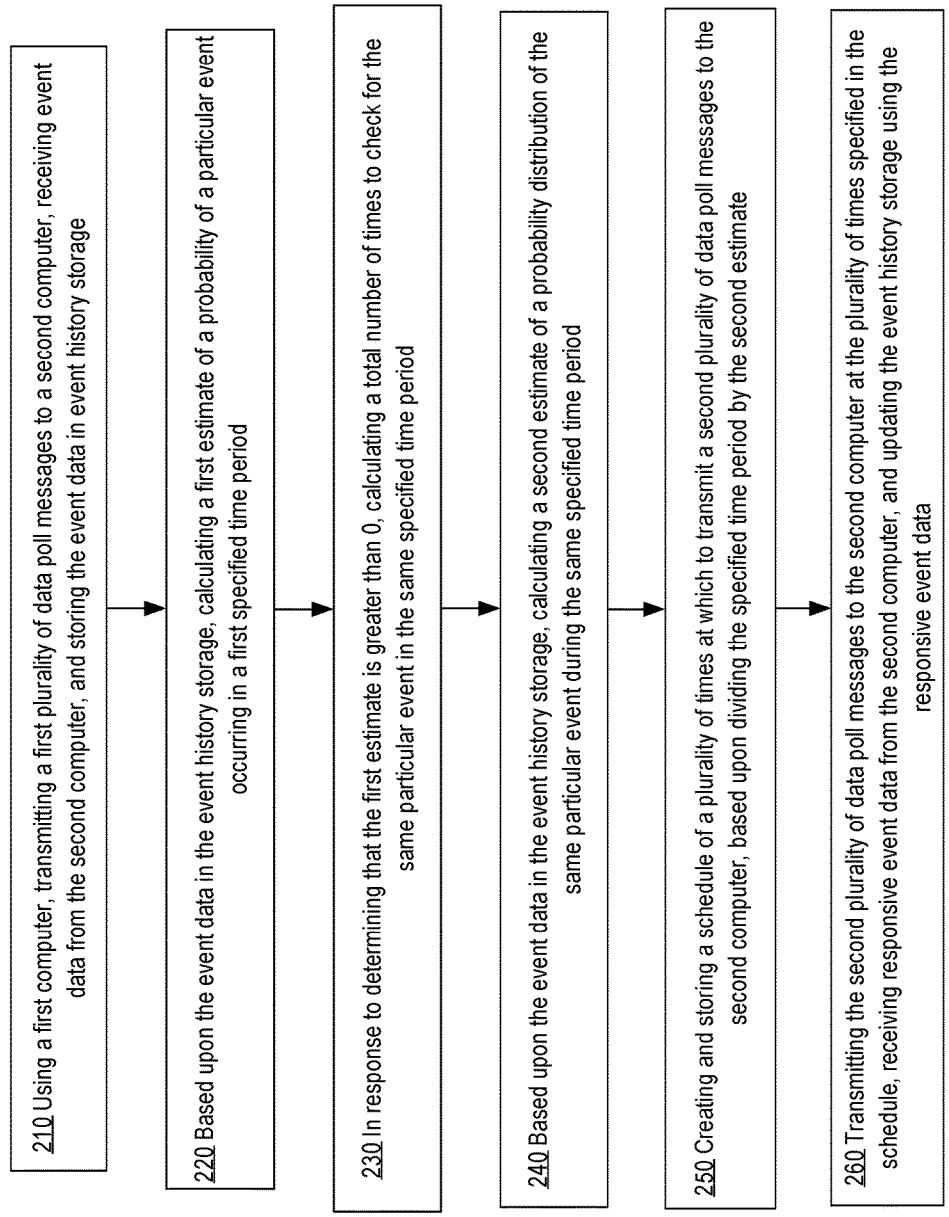
FIG. 2 illustrates a method for data analysis in an example embodiment.

FIG. 2 illustrates a method for data analysis in an example embodiment. FIG. 2 illustrates an algorithm, plan or specification that may be used as a basis of programming the instructions described above for FIG. 1 and the functional operations that are described in FIG. 2 and described in other sections of this disclosure. Further, FIG. 2 is described at the same level of detail that is ordinarily used, by persons of skill in the arts to which this disclosure pertains, to communicate among themselves about algorithms, plans or specifications for other programs in the same technical field. In an embodiment, method 200 of FIG. 2 may be performed using server 130.

At step 210, a first computer is used to transmit a first plurality of data polling messages to a second computer. For example, server 130, using API polling service instructions 131, may transmit requests in the form of data poll messages to partner server 110 through API 112 to request event data. In response, partner server 110 may send back event data, which is received by server 130.

For example, assume that partner server 110 hosts listings, contributed by different client computers, users or accounts, about apartment homes that are available for lease. The server 130 may send a request to partner server 110 through API 112 for updates on posts relating to the availability of two-bedroom apartments. If no updates on two-bedroom apartment posts have occurred, partner server 110 may send a response indicating that no updates have occurred. If an update on two-bedroom apartment posts has occurred, partner server 110 may send a response with event data indicating that an update has occurred.

In response, API polling service instructions 131 may receive the event data and generate event tracking data, which tracks the specific time a particular event occurred. The data and event tracking data may then be sent to event data processor instructions 132 where the data is formatted. The event data may then be stored in the event history storage 133 associated with the server 130 as a plurality of key-value pairs. Each key may be based, in part, upon a date value specifying a date on which a corresponding event occurred. Each event value may be a list of all minute values, within the associated date, at which the corresponding event occurred. The event value may be stored in seconds, minutes, or hours.

The process 200 to this point has resulted in receiving and storing data about past polling requests and events that were represented in responses to the polling requests. The process 200 in subsequent steps is programmed or configured to determine when next to send polling messages on an optimized basis.

At step 220, based upon the event data in the event history storage, a first estimate of a probability of a particular event occurring in a first specified time period is calculated. The specified period of time may be in seconds, minutes, hours, days, weeks, months, or years and typically represents some future time period. For example, the estimate may signify the probability that a lease listing for a two-bedroom apartment will appear at a partner server 110 within the month of January 2017.

In an embodiment, the probability of an event occurring within a specified time period may be written as $P(r_e|t_d)$, where $t_d$ is a time period, such as a particular day, and $r_e$ is an event. The time period and event may be specified using a configuration file, via user input from an administrator computer coupled to server 130, or programmatically based upon a table of all time periods and events that are of interest.

In an embodiment, the intelligent schedule generator instructions 134 may be programmed for calculating the estimated probability according to the following programmed logistic regression model:

$$P(r_e|t_d) = \frac{1}{1 + e^{\left(-\sum_{n=1}^{N} w_i f_{re^i}\right)}}$$

In this example, $f_{re^i}$ may be the value of an $i^{th}$ factor for the event $r_e$. One factor may be the number of times an event occurred during a specific period in the past (e.g. the total number of times the event $r_e$ occurred within the past week). Other factors may be, for example, the number of times an event occurred at a similar time in the past (e.g. last week on the same weekday as day $t_d$), and how infrequently an event occurred during a specific period of time (e.g. the number of days the event $r_e$ did not occur within the past week). These historic data values may be obtained from event history storage 133 and a specification of which factors to use may be hard-coded, stored in a configuration file, or stored in a mapping or table of one of the databases of FIG. 1 or a different database. In one embodiment, the values of the foregoing factors may be pre-computed, before step 220, in an offline process that processes all data accumulated thus far in event history storage 133.

In the programmed logistic regression model above, $w_i$ may be a weight associated with the $i^{th}$ factor, which reflects the relation between the $i^{th}$ factor and the probability of the particular event occurring in the first specified time period. An increase in the probability of the event occurring may be associated with a positive weight value while a decrease in the probability of the event occurring may be associated with a negative weight value. For example, if a factor has a positive weight, as the value of this factor increase, the probability of the event occurrence will increase. If a factor has negative weight, as the value of this factor increases, the probability of the event occurrence will decrease. The weights may be determined using historical data from the event history storage 133. In one embodiment, the weight values may be pre-computed, before step 220, in an offline process that processes all data accumulated thus far in event history storage 133.

In step 230, in response to determining that the first estimate is greater than zero, the process calculates a total number of times to check for the same particular event in the same specified time period, as part of future polling operations. For example, the intelligent schedule generator instructions 134 may be programmed for estimating the total number of times to check for the event in the specified time period, in future polling operations, according to the following programmed function:

$$f_{r_e t_d} = s \, P(r_e|t_d)$$

where s may be a scaling factor. The value of the scaling factor may be based on the amount of resources allocated and may be specified in stored configuration data. If s is a high number, then polling for events will occur more frequently, which results in the need for more resources. If s is a low number, polling for events will occur less frequently, which results in the need for less resources. For example, s may be approximately equal to "100".

If the probability of an event occurring within a specified period, $P(r_e|t_d)$, is zero, then the intelligent schedule generator instructions 134 may be programmed for estimating the total number of times to check for an event based on a predetermined number. For example, if there is no probability of an event occurring, then the intelligent schedule generator instructions 134 may use a predetermined number, such as twenty-four times, to check for an event during a twenty-four-hour period. The predetermined number may be any number of times during any specified period, though the number may be limited based on resources, and may be specified in configuration data, via input from an administrator computer, or may be hard-coded as a default value.

In step 240, based upon the event data in the event history storage, a second estimate of a probability distribution of the same particular event during the same specified time period is calculated. The probability distribution indicates how likely the same event will occur over the same specified time. In some embodiments, the probability distribution may be estimated using logistic regression and/or a Bayesian algorithm. In some embodiments, the probability distribution may be estimated using a modified version of the Kernel Density Estimation (KDE) algorithm. Intelligent schedule generator instructions 134 may contain instructions for calculating the probability distribution $f_{re}(t)$ according to the following programmed KDE algorithm:

$$f_{r_e}(t) = \frac{1}{\sum_{k=1}^{m} w_k} \sum_{j=1}^{m} w_j \frac{1}{n_j h_j} \sum_{i=1}^{n_j} K\left(\frac{t - t_{ji}}{h_j}\right)$$

In the programmed KDE algorithm above, m may be the total number of types of events used for the prediction and $n_j$ may be the total number of occurrences of event type j in a specific time period in the past (e.g. in the last seven days). K(.) may be a non-negative kernel function that integrates to one and has a mean of zero. In the algorithm above, $h_j>0$ represents a smoothing parameter for the event type j known as the bandwidth. The parameters $w_j$ and $h_j$ may be determined using historical data from event history storage 133. The kernel function may be calculated accord to the following Gaussian kernel function:

$$K(x) = \frac{1}{\sqrt{2\Pi}} e^{\left(-\frac{x^2}{T}\right)}$$

The probability distribution may be a Gaussian normal distribution, which is typically visually represented as a bell-shaped curve, and may be stored in memory or non-volatile data storage as a set of data values. The probability distribution may also be a non-normal distribution, such as a multimodal distribution, or a continuous normal distribution. For example, if the probability of an event occurring within a specified period, P ($r_e|t_d$), is 0, the probability distribution may be a continuous normal distribution.

In step 250, the process creates and stores a schedule of a plurality of times at which to transmit a second plurality of data poll messages to the second computer, based upon dividing the specified time period by the second estimate. This is an optimized schedule of future polling operations to be conducted. Specifically, intelligent schedule generator instructions 134 may be programmed for calculating a probability mass value. Over a given time period $$\int_0^T f_{r_e}(t) = 1,$$

each event poll of the total number of event polls $f_{retd}$ can be assigned a 1/fretd probability mass. Intelligent schedule generator instructions 134 may contain further instructions for calculating and returning a schedule of minutes to poll during a given time period using: the probability mass, 1/fretd, the total number of times to check for the same particular event in the same specified time period, $f_{retd}$, and the probability distribution of the same particular event in the same specified time period, $f_{re}(t)$. TABLE 1 below is an example programming procedure for returning the schedule.

TABLE 1

EXAMPLE SCHEDULE PROCEDURE

```
function_generateSchedule(f_retd, f_re(t) );
n = 0
schedule = { }
lastAdded = 0
while n < f_retd
    minutes = lastAdded
    while minutes < T
```

TABLE 1-continued

EXAMPLE SCHEDULE PROCEDURE

```
        if ∫_lastAdded^minutes fre(t) > Probability_per_check
            schedule.add (minutes)
            lastAdded = minutes
            n = n+1
            break
        else
            minutes = minutes+1
    return schedule
```

In the procedure above, $f_{retd}$ may be the number of times to poll for an event during a time period, $f_{re}(t)$ may be the probability distribution of the event occurring over the time period, and Probability_per_check may be the probability mass $1/fr_e t_d$. When a program following the procedure above is executed, a schedule of minutes to poll during a given time period may be created.

The schedule may be stored in API polling schedule storage 135 as a plurality of key-value pairs. Each key in the key-value pairs may be data items such as a day and a time during the day. The time may be stored in seconds, minutes, or hours. The value in the key-value pairs may be data items a list of all events to be polled at the day and time indicated by the key. For example, each key of the key-value pairs may comprise a combination of a weekday value and a minute value for a particular minute within a weekday represented in the weekday value. Each value of the key-value pairs may comprise a list of all events to poll at a particular minute value of the weekday. The events may be identified with event ID's.

The schedule may follow the probability distribution created in step 240. For example, if the probability of an event occurring is represented by a normal distribution where the event will most likely occur at 12:00 PM on any given day, the schedule may indicate an increase in the frequency of polling as time approaches 12:00 PM and a decrease in the frequency of polling as time moves away from 12:00 PM. If the probability of an event occurring is represented by a non-normal distribution, such as a bimodal distribution where the event will most likely occur at 10:00 AM and at 2:00 PM on any given day, the schedule may indicate an increase in frequency of polling as time approaches 10:00 AM and 2:00 PM, and a decrease in the frequency of polling as time moves away from 10:00 AM and 2:00 PM. If the probability of an event occurring is represented by a continuous normal distribution where the event will most likely not occur at all on any given day, the schedule may indicate a consistent frequency of polling throughout the day, such as once every hour over the course of twenty-four hours, as determined by the predetermined number in step 230.

In step 260, the second plurality of data poll messages is transmitted to the second computer at the plurality of times specified in the schedule, responsive event data is received from the second computer, and the event history storage is updated using the responsive event data.

For example, API polling service instructions 131 may use the schedule generated by intelligent schedule generator instructions 134, and stored in API polling schedule storage 135, to transmit requests in the form of data poll messages to API 112 of partner server 110 at the times specified in the schedule. In response, partner server 110 may send event data, which is received by the API polling service instructions 131. The event history storage 133 may then be updated using the responsive event data. The updated event data stored in the event history storage 133 as key-value pairs may be used in subsequent calculations. Therefore, the approaches herein involve not only generating an optimized schedule for conducting polling, but using the resulting stored optimized schedule to drive polling messages or operations directed at particular target server computers such as partner servers 110.

Figure 3:
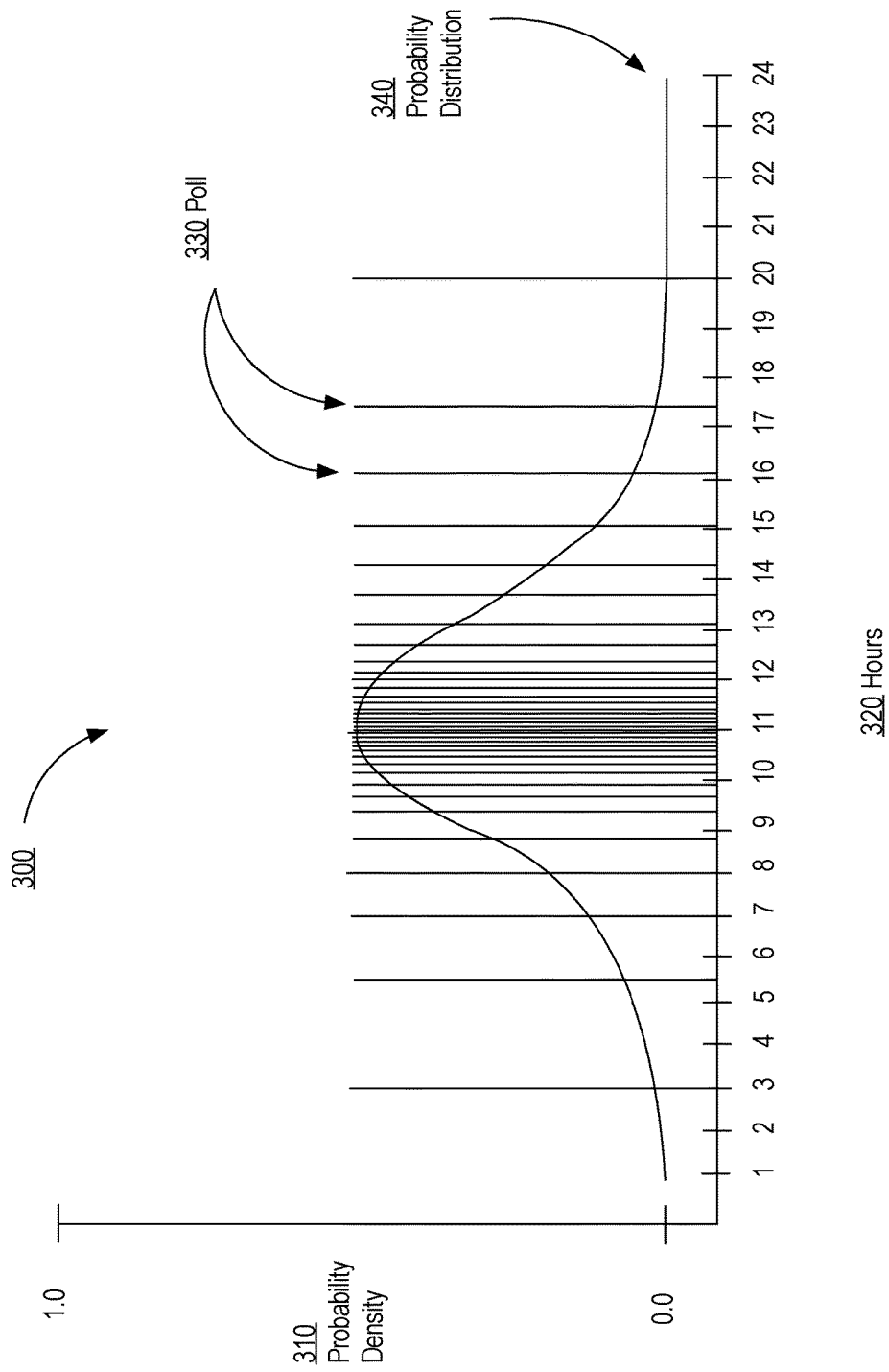
FIG. 3 illustrates a frequency of polling based on a schedule in an example embodiment.

FIG. 3 visually illustrates data representing a frequency of polling based on a schedule in an example embodiment.

The example of FIG. 3 effectively illustrates the improvement in data processing efficiency that is achieved by the present techniques. An example graph 300 shows an example probability distribution 340, in the form of a line that generally follows the bell-shaped curve classically seen in a normal probability distribution. The vertical axis, labeled probability density 310, indicates the magnitude of the probability of an event occurring. The horizontal time axis 320 is labeled with integer values for hours over a period of twenty-four hours. Therefore, based on historic data as shown by line 340, a particular event represented by the line is most likely to occur at 11:00 AM on any given day.

An approach of polling each hour in a 24-hour period, or every 30 minutes, would be inefficient because the likelihood of the event occurring at, say, 2:00 AM or 8:00 PM is low.

With the techniques disclosed herein, API polling service instructions 131 would result in forming a schedule to poll only at the times indicated by poll lines 330. Those times would constitute the schedule that is generated in step 250. In this example, with such an optimized polling schedule, the frequency of polling increases greatly as time approaches 11:00 AM, and decreases as time moves away from 11:00 AM, either earlier or later.

The frequency of polling in step 260 is determined by the schedule created in step 250, which in turn, is based on the calculations of step 220, step 230, and step 240. As the likelihood of successfully polling partner server 110 for specific event data increases, the frequency of polling may increase. Similarly, as the likelihood of successfully polling partner server 110 for specific event data decreases, the frequency of polling may decrease. The frequency of polling may increase or decrease by the second, minute, hour, day, month, or year, depending on the historical event data stored in event history storage 133.

Therefore it will be apparent that sending polling messages from server 130 to a partner server 110 frequently at a point close to the time with the calculated highest probable occurrence of the event, which is 11:00 AM in this example, and less frequently at other times when the occurrence has been calculated as improbable, provides the greatest efficiency in use of CPU resources for both server 130 and partner servers 110, network bandwidth, use of network adapters or interfaces, and so forth.

Using the foregoing techniques, programmed computers may automatically determine the best frequency at which to poll another system to obtain data. Implementations provide a targeted approach to polling that uses fewer resources while maximizing the probability of successfully polling for specific event data. Benefits of the approaches herein include execution of fewer CPU cycles at the time of polling, and reduced use of memory, other storage and network bandwidth, because poll messages are sent at optimized times when new event data is likely to exist.

Moreover, the approaches disclosed herein improve the technology of server-based publishing of data, because the partner servers 110 are not required to respond to polling messages, or internally check for the availability of new event data, as often. Instead, the partner servers 110 receive fewer requests at optimized times and check for new event data only at times when such data is likely to exist. For the same reasons, the approaches herein improve networked data communication technology by reducing use of network bandwidth.

Still another improvement to a different technology relates to improved data delivery to client computers. The approach disclosed herein specifically relates to optimizing when poll data collection messages are dispatched from a first computer to a second computer, for the purpose of obtaining data from the second computer for processing at the first computer. However, a result of these approaches is that later delivery of the processed data from the first computer to client computers, or other systems, also is more accurate and effective. Client computers, for example, receive updates closer in time to when events actually occurred at the second computer or in association with the second computer. Therefore, the client computers can use the data more efficiently. Further, any substantive application that the client computers are executing will receive input data more efficiently and then can use that data in the substantive application more effectively. If the client computers are executing programs having operations that are triggered by incoming data updates, then the operation of those client computers also will be more efficient because processing is triggered on an optimized basis because the polled data updates were collected on an optimized basis.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
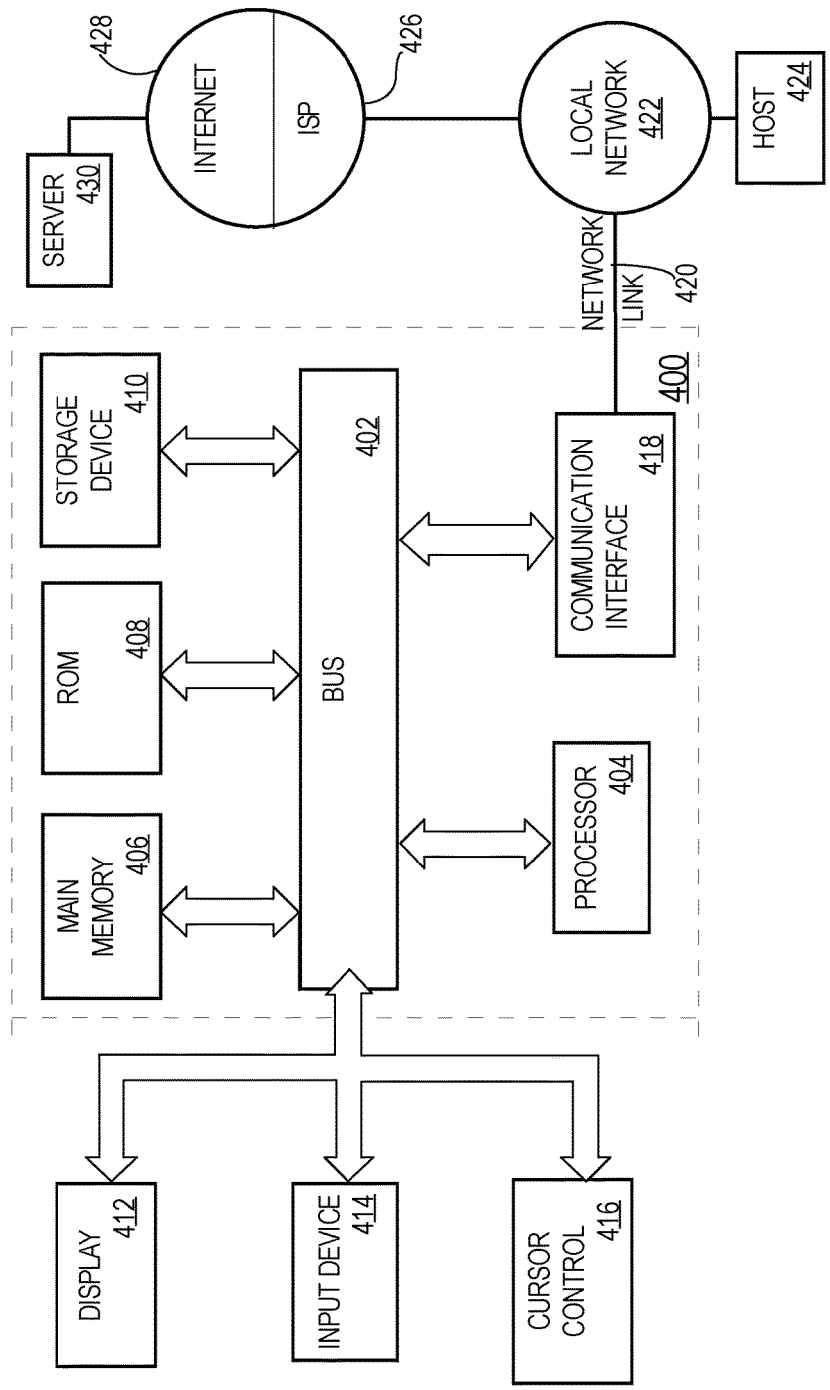
FIG. 4 illustrates a computer system upon which an embodiment of the invention may be implemented.

For example, FIG. 4 is a block diagram that illustrates a computer system upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in computer efficiency in transmitting data poll messages to another computer, the method comprising:

using a first computer, transmitting a first plurality of data poll messages to a second computer, receiving event data from the second computer, and storing the event data in event history storage;

based upon the event data in the event history storage, calculating a first estimate of a probability of a particular event occurring in a first specified time period using a programmed logistic regression comprising instructions for computing:

$$P(r_e | t_d) = \frac{1}{1 + e^{(-\sum_{i=1}^{n} w_i f_{rei})}}$$

where $f_{r_e^i}$ is the value of an $i^{th}$ factor for an event $r_e$; $w_i$ is a weight associated with the $i^{th}$ factor and reflects a relationship between the $i^{th}$ factor and the probability of the particular event occurring in the first specified time period;

in response to determining that the first estimate is greater than 0, calculating a total number of times to check for the same particular event in the same specified time period;

based upon the event data in the event history storage, calculating a second estimate of a probability distribution of the same particular event during the same specified time period;

creating and storing a schedule of a plurality of times at which to transmit a second plurality of data poll messages to the second computer, based upon dividing the specified time period by the second estimate;

transmitting the second plurality of data poll messages to the second computer at the plurality of times specified in the schedule, receiving responsive event data from the second computer, and updating the event history storage using the responsive event data;

wherein the method is performed using one or more computing devices.

2. The method of claim 1, further comprising estimating a total number of times to check for the particular event in the specified time period using a programmed function comprising instructions for computing:

$$f_{r_e t_d} = s P(r_e | t_d)$$

where s is a scaling factor.

3. The method of claim 2, further comprising calculating the second estimate using a programmed kernel density estimation algorithm comprising instructions for computing:

$$f_{r_e}(t) = \frac{1}{\sum_{k=1}^{m} w_k} \sum_{j=1}^{m} w_j \frac{1}{n_j h_j} \sum_{i=1}^{n_j} K\left(\frac{t - t_{ji}}{h_j}\right)$$

where m comprises a total number of types of events; $n_j$ is a total number of occurrences of the particular event j in the specified time period; K(.) is a kernel function; $h_j > 0$ is a smoothing parameter for event j; $w_j$ and $h_j$ are learned using the event data in the event history storage.

4. The method of claim 1, further comprising transmitting the second plurality of data poll messages to an Application Program Interface (API) of the second computer at the plurality of times specified in the schedule.

5. The method of claim 1, further comprising storing the event data in the event history storage as a plurality of key value pairs, in which each key is based in part upon a date value specifying a date on which a corresponding event occurred, and in which each value comprises a list of all minute values, within the associated date, at which the corresponding event occurred.

6. The method of claim 1, further comprising creating and storing the schedule using a plurality of key-value data items, in which each key comprises a combination of a weekday value and a minute value for a particular minute within a weekday represented in the weekday value, and in which each value of the key-value data items comprises a list of all events to poll at a particular minute value of the weekday.

7. A computer system that is programmed to provide an improvement in computer efficiency in transmitting data poll messages to another computer, the system comprising:

API polling service instructions hosted at a first computer and programmed to transmit a first plurality of data poll messages to a second computer, to receive event data from the second computer, and to signal event data processor instructions;

wherein the event data processor instructions are programmed to store the event data in event history storage;

intelligent schedule generator instructions hosted at the first computer and programmed, based upon the event data in the event history storage, to:

calculate a first estimate of a probability of a particular event occurring in a first specified time period using a logistic regression comprising instructions for computing:

$$P(r_e | t_d) = \frac{1}{1 + e^{(-\sum_{i=1}^{n} w_i f_{rei})}}$$

where $f_{r_e^i}$ is the value of an $i^{th}$ factor for an event $r_e$; $w_i$ is a weight associated with the $i^{th}$ factor and reflects a relationship between the $i^{th}$ factor and the probability of the particular event occurring in the first specified time period;

in response to determining that the first estimate is greater than 0, calculate a total number of times to check for the same particular event in the same specified time period;

based upon the event data in the event history storage, calculate a second estimate of a probability distribution of the same particular event during the same specified time period;

create and store, in API polling schedule storage coupled to the first computer, a schedule of a plurality of times at which to transmit a second plurality of data poll messages to the second computer, based upon dividing the specified time period by the second estimate;

wherein the API polling service instructions are further programmed to transmit the second plurality of data poll messages to the second computer at the plurality of times specified in the schedule, to receive responsive event data from the second computer, and to update the event history storage using the responsive event data.

8. The computer system of claim 7, wherein the intelligent schedule generator instructions further comprise instructions which when executed using the first computer cause estimating a total number of times to check for the particular event in the specified time period using a programmed function comprising instructions for computing:

$$f_{r_e t_d} = sP(r_e | t_d)$$

where s is a scaling factor.

9. The computer system of claim 8, wherein the intelligent schedule generator instructions further comprise instructions which when executed using the first computer cause calculating the second estimate using a programmed kernel density estimation algorithm comprising instructions for computing:

$$f_{r_e}(t) = \frac{1}{\sum_{k=1}^{m} w_k} \sum_{j=1}^{m} w_j \frac{1}{n_j h_j} \sum_{i=1}^{n_j} K\left(\frac{t - t_{ji}}{h_j}\right)$$

where m comprises a total number of types of events; $n_j$ is a total number of occurrences of the particular event j in the specified time period; $K(.)$ is a kernel function; $h_j > 0$ is a smoothing parameter for event j; $w_j$ and $h_j$ are learned using the event data in the event history storage.

10. The computer system of claim 7, wherein the intelligent schedule generator instructions further comprise instructions which when executed using the first computer cause transmitting the second plurality of data poll messages to an Application Program Interface (API) of the second computer at the plurality of times specified in the schedule.

11. The computer system of claim 7, wherein the API polling service instructions further comprise instructions which when executed using the first computer cause storing the event data in the event history storage as a plurality of key value pairs, in which each key is based in part upon a date value specifying a date on which a corresponding event occurred, and in which each value comprises a list of all minute values, within the associated date, at which the corresponding event occurred.

12. The method of claim 7, wherein the API polling schedule storage comprises the schedule stored using a plurality of key-value data items, in which each key comprises a combination of a weekday value and a minute value for a particular minute within a weekday represented in the weekday value, and in which each value of the key-value data items comprises a list of all events to poll at a particular minute value of the weekday.

13. A data processing method providing an improvement in computer efficiency in transmitting data poll messages to another computer, the method comprising:
   using a first computer, transmitting a first plurality of data poll messages to an application program interface (API) of a second computer, receiving event data from the second computer, and storing the event data in event history storage;
   based upon the event data in the event history storage, calculating a first estimate of a probability of a particular event occurring in a first specified time period using a programmed logistic regression comprising instructions for computing:

$$P(r_e | t_d) = \frac{1}{1 + e^{(-\sum_{i=1}^{n} w_i f_{r_e i})}}$$

where $f_{r_e i}$ is the value of an $i^{th}$ factor for an event $r_e$; $w_i$ is a weight associated with the $i^{th}$ factor and reflects a relationship between the $i^{th}$ factor and the probability of the particular event occurring in the first specified time period;
   in response to determining that the first estimate is greater than 0, calculating a total number of times to check for the particular event in the specified time period using a programmed function comprising instructions for computing:

$$f_{r_e t_d} = sP(r_e | t_d)$$

where s is a scaling factor;
   based upon the event data in the event history storage, calculating a second estimate of a probability distribution of the same particular event during the same specified time period using a programmed kernel density estimation algorithm comprising instructions for computing:

$$f_{r_e}(t) = \frac{1}{\sum_{k=1}^{m} w_k} \sum_{j=1}^{m} w_j \frac{1}{n_j h_j} \sum_{i=1}^{n_j} K\left(\frac{t - t_{ji}}{h_j}\right)$$

where m comprises a total number of types of events; $n_j$ is a total number of occurrences of the particular event j in the specified time period; $K(.)$ is a kernel function; $h_j > 0$ is a smoothing parameter for event j; $w_j$ and $h_j$ are learned using the event data in the event history storage;
   creating and storing a schedule of a plurality of times at which to transmit a second plurality of data poll messages to the second computer, based upon dividing the specified time period by the second estimate;
   transmitting the second plurality of data poll messages to an Application Program Interface (API) of the second computer at the plurality of times specified in the schedule.

14. The method of claim 13, further comprising storing the event data in the event history storage as a plurality of key value pairs, in which each key is based in part upon a date value specifying a date on which a corresponding event occurred, and in which each value comprises a list of all minute values, within the associated date, at which the corresponding event occurred.

15. The method of claim 13, further comprising creating and storing the schedule using a plurality of key-value data items, in which each key comprises a combination of a weekday value and a minute value for a particular minute within a weekday represented in the weekday value, and in which each value of the key-value data items comprises a list of all events to poll at a particular minute value of the weekday.

* * * * *